United States Patent
Kinzie et al.

(10) Patent No.: US 9,115,699 B2
(45) Date of Patent: Aug. 25, 2015

(54) ULTRASONIC SOUND EMITTING DEVICES FOR WIND TURBINES

(75) Inventors: Kevin Wayne Kinzie, Spartanburg, SC (US); Thomas Joseph Fischetti, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 527 days.

(21) Appl. No.: 13/406,875

(22) Filed: Feb. 28, 2012

(65) Prior Publication Data
US 2013/0224018 A1 Aug. 29, 2013

(51) Int. Cl.
*F04D 29/00* (2006.01)
*F03D 11/00* (2006.01)

(52) U.S. Cl.
CPC .......... *F03D 11/0041* (2013.01); *Y02E 10/721* (2013.01); *Y02E 10/722* (2013.01)

(58) Field of Classification Search
CPC . F03D 11/0041; F03D 1/0608; Y02E 10/721; Y02E 10/722
USPC ............. 416/91, 62, 90 A, 90 R, 93 R, 146 R
See application file for complete search history.

(56) References Cited

U.S. PATENT DOCUMENTS

| | | | |
|---|---|---|---|
| 2,238,668 A | 4/1941 | Wellenstein | |
| 3,156,212 A | 11/1964 | Buell | |
| 3,157,153 A | 11/1964 | Moe | |
| 3,230,923 A * | 1/1966 | Hughes | 116/137 A |
| 3,376,847 A * | 4/1968 | Cheeseman, Jr. | 116/137 A |
| 3,666,976 A * | 5/1972 | Gourlay et al. | 310/324 |
| 3,721,521 A * | 3/1973 | Schmidlin | 432/227 |
| 4,131,390 A * | 12/1978 | Schmidt | 416/20 R |
| 4,150,637 A * | 4/1979 | Penick | 116/58 R |
| 4,437,428 A * | 3/1984 | Hoffelner | 116/137 R |
| 5,791,541 A | 8/1998 | Jitsuishi et al. | |
| 5,791,875 A * | 8/1998 | Ngo | 416/90 A |
| 6,250,255 B1 | 6/2001 | Lenhardt et al. | |
| 6,623,243 B1 | 9/2003 | Hodos | |
| 7,370,601 B1 * | 5/2008 | Williams | 116/22 A |
| 7,487,737 B1 | 2/2009 | Williams | |

(Continued)

FOREIGN PATENT DOCUMENTS

DE 102007025314 12/2008
DE 202010003983 U1 8/2010

(Continued)

OTHER PUBLICATIONS

Hartman, J and Trudso E; "Synchronisation of Air-Jet Generators with an Appendix on the Stem Generator", 1951, pp. 1-5.*

(Continued)

*Primary Examiner* — Dwayne J White
*Assistant Examiner* — Jason Fountain
(74) *Attorney, Agent, or Firm* — Dority & Manning, P.A.

(57) ABSTRACT

A rotor blade for a wind turbine is disclosed. The rotor blade may generally include a body extending between a blade root and a blade tip. The body may include a pressure side and a suction side extending between a leading edge and a trailing edge. In addition, the rotor blade may include a nozzle mounted on or within the body. The nozzle may include an inlet, an outlet and a converging section between the inlet and the outlet. The converging section may be configured to accelerate a flow of air through the nozzle such that an ultrasonic sound emission is produced.

20 Claims, 5 Drawing Sheets

(56) References Cited

U.S. PATENT DOCUMENTS

| | | | |
|---|---|---|---|
| 8,093,994 | B2 | 1/2012 | Mcgaughy et al. |
| 8,579,594 | B2 * | 11/2013 | Fuglsang et al. .......... 416/231 R |
| 8,598,998 | B2 | 12/2013 | Vassilev et al. |
| 8,869,734 | B2 | 10/2014 | Livingston |
| 2005/0162978 | A1 | 7/2005 | Lima |
| 2008/0260531 | A1 | 10/2008 | Stommel |
| 2008/0298962 | A1 | 12/2008 | Sliwa |
| 2009/0185900 | A1 | 7/2009 | Hirakata et al. |
| 2009/0295165 | A1 | 12/2009 | Giguere et al. |
| 2010/0143121 | A1 | 6/2010 | Haans et al. |
| 2011/0192212 | A1 | 8/2011 | Delprat et al. |
| 2012/0003089 | A1 | 1/2012 | Byreddy et al. |
| 2013/0050400 | A1 | 2/2013 | Stiesdal et al. |
| 2013/0052010 | A1 | 2/2013 | Nielsen et al. |
| 2013/0224018 | A1 | 8/2013 | Kinzie et al. |
| 2013/0249218 | A1 | 9/2013 | Vassilev et al. |
| 2014/0148978 | A1 | 5/2014 | Duncan et al. |

FOREIGN PATENT DOCUMENTS

| | | | |
|---|---|---|---|
| JP | 2009191807 | A | 8/2009 |
| JP | 2009257322 | A | 11/2009 |
| WO | 2010/076500 | | 7/2010 |

OTHER PUBLICATIONS

Joseph M. Szewczak, PhD., Ultrasound emissions from wind turbines as a potential attractant to bats: a preliminary investigation. pp. 1-11; Humboldt State University, Arcata, CA; May 1, 2006.

Genevieve R. Spanjer, Responses of the big brown bat, *Eptesicus fusus*, to an acoustic deterrent device in a lab setting. pp. 1-12; University of Maryland; Dec. 2006.

Joseph M. Szewczak, PhD., Preliminary Field Results of an Acoustic Deterrent with the Potential to Reduce Bat Mortality from Wind Turbines. pp. 1-7; Humboldt State University, Arcata, CA; Aug. 23, 2006.

Joseph M. Szewczak, PhD., Field Test Results of a Potential Acoustic Deterrent to Reduce Bat Mortality from Wind Turbines. pp. 1-14; Humboldt State University, Arcata, CA; Oct. 18, 2007.

Jason W. Horn, Edward B. Arnett, Mark Jensen, Thomas H. Kunz, Testing the effectiveness of an experimental acoustic bat deterrent at the Maple Ridge wind farm. pp. 1-30; Bat Conservation International, Austin, TX; Jun. 24, 2008.

Edward B. Arnett, Michael Schirmacher, Effectiveness of Changing Wind Turbine Cut-in Speed to reduce Bat Fatalities at Wind Facilities, 2008 Annual Report. Bat Conservation International; pp. 2-44; Apr. 2009.

Edward B. Arnett, Michael Schirmacher, Effectiveness of Changing Wind Turbine Cut-in Speed to reduce Bat Fatalities at Wind Facilities, Final Report. Bat Conservation International; pp. 2-57; May 2010.

Edward B. Arnett, Cris Hein, Michael Schirmacher, Michael Baker, Evaluating the effectiveness of an ultrasonic acoustic deterrent for reducing bat fatalities at wind turbines, Final Report; pp. 2-45; Dec. 2011.

Edward B. Arnett, Manuela MP Huso, Michael Schirmacher, John Hayes, Frontiers in Ecology and the Environment; Altering Turbine speed reduces bat mortality at wind-energy facilities. pp. 2-8; 2010. Wind Power and Wildlife in Colorado, Symposium and Workshop, Jan. 23-25, 2006, 27 pages.

10th Meeting of the Advisory Committee, Bratislava, Slovak Republic, Apr. 25-27, 2005, Report of the Intersessional Working Group on Wind Turbines and Bat Populations, 21 pages.

Erin F. Baerwald, et al., A Large-Scale Mitigation Experiment to Reduce Bat Fatalities at Wind Energy Facilities, Aug. 2009, 5 pages.

Dr. Hermann Hotker, et al., Auswirkungen regenerativer. . . , Dec. 2004, 80 pages.

"Scientist find successful way to reduce bat deaths at wind turbines," Sep. 28, 2009, http://www.physorg.com/news173364700.html.

"Bat deaths from wind turbines explained," Aug. 25, 2008, http://www.ucalgary.ca/news/aug2008/batdeaths.

Bats and Wind Energy Cooperative, Research, Operational Mitigation & Deterrents, 2008, http://www.batsandwind.org/main.asp?page=research&sub=operational.

Denmark Office Action and Search Report for PA201370106, dated Sep. 15, 2014 (5 pages).

* cited by examiner

ULTRASONIC SOUND EMITTING DEVICES FOR WIND TURBINES

FIELD OF THE INVENTION

The present subject matter relates generally to wind turbines and, more particularly, to ultrasonic sound emitting devices that may be mounted on or within wind turbine rotor blades to deter bats.

BACKGROUND OF THE INVENTION

Wind power is considered one of the cleanest, most environmentally friendly energy sources presently available, and wind turbines have gained increased attention in this regard. However, while being considered environmentally safe, wind turbines can pose a threat to bats. Specifically, it has been found that bats may have trouble detecting the rotating rotor blades of a wind turbine. As a result, bats can be struck by the rotor blades and killed. The occurrence of such bat strikes have led many to enact regulations and/or laws prohibiting and/or discouraging the placement of wind turbines in areas of high bat populations and/or restricting the operations of the wind turbines at night.

Many believe that ultrasonic sound in the frequency range of about 25 kHz to about 100 kHz may be effective at deterring bats by interfering with both the bats' natural sonar and their ability to hunt insects. However, generating enough sound to cover the entire rotor diameter of a wind turbine has proved to be a difficult task. For example, previous attempts have focused on the use of speakers mounted on the nacelle. Unfortunately, due to dissipation of the sound, it has been found that nacelle mounted speakers are incapable of generating enough acoustic power to cover the entire rotor diameter of the wind turbine.

Accordingly, a blade mounted, ultrasonic sound emitting device that is capable of producing sufficient acoustic power to cover the entire rotor diameter of a wind turbine would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade for a wind turbine. The rotor blade may generally include a body extending between a blade root and a blade tip. The body may include a pressure side and a suction side extending between a leading edge and a trailing edge. In addition, the rotor blade may include a nozzle mounted on or within the body. The nozzle may include an inlet, an outlet and a converging section between the inlet and the outlet. The converging section may be configured to accelerate a flow of air through the nozzle such that an ultrasonic sound emission is produced.

In another aspect, the present subject matter directed to a wind turbine including a tower, a nacelle mounted atop the tower and a rotor coupled to the nacelle. The rotor may include a hub and at least one rotor blade extending outwardly from the hub. Additionally, the wind turbine may include a nozzle mounted on or within the rotor blade. The nozzle may include an inlet, an outlet and a converging section between the inlet and the outlet. The converging section being configured to accelerate a flow of air through the nozzle such that an ultrasonic sound emission is produced.

In a further aspect, the present subject matter is directed to a method for producing an ultrasonic sound emission from a rotor blade of a wind turbine. The method may generally include rotating the rotor blade such that an airflow is directed through a nozzle mounted to an exterior surface of the rotor blade, the nozzle including an inlet, an outlet and a converging section between the inlet and outlet and accelerating the airflow through the converging section such that an ultrasonic sound emission is produced.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to rotor blades having ultrasonic sound emitting devices configured to produce sound at a frequency within the ultrasonic range (e.g., from about 25 kHz to about 100 kHz). In several embodiments, the ultrasonic sound emitting devices may be passive devices. For example, in one embodiment, a converging nozzle may be mounted to the exterior of a rotor blade such that, as the rotor blade rotates, an airflow is directed into the nozzle and is choked, thereby producing an air jet (e.g., a supersonic jet) at the nozzle outlet that emits sound within the ultrasonic frequency range. In other embodiments, the ultrasonic sound emitting devices may be active devices. For instance, a converging nozzle may be mounted within the body of a rotor blade such that the nozzle outlet extends through the body and is exposed to the exterior of the blade. In such an embodiment, an airflow from a pressurized air source may be directed into the nozzle to produce an air jet at the nozzle outlet that emits sound within the ultrasonic frequency range. Regardless, it is believed that the ultrasonic sound emitting from the disclosed nozzles may deter bats from flying into and/or adjacent to a wind turbine. Additionally, due to the fact that the disclosed nozzles may be mounted on or within the rotor blades of a wind turbine, the ultrasonic sound emission produced by the nozzles may cover the entire rotor diameter of the wind turbine.

Figure 1:
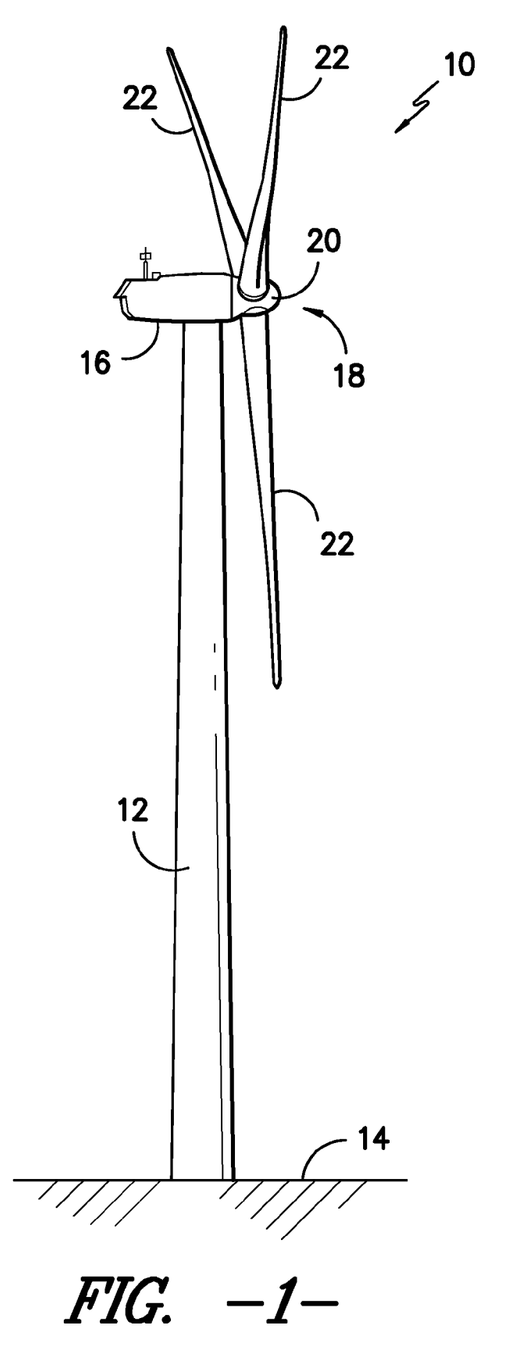
FIG. 1 illustrates a perspective view of one embodiment of a wind turbine.

Referring now to the drawings, FIG. 1 illustrates perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figures 2, 3:
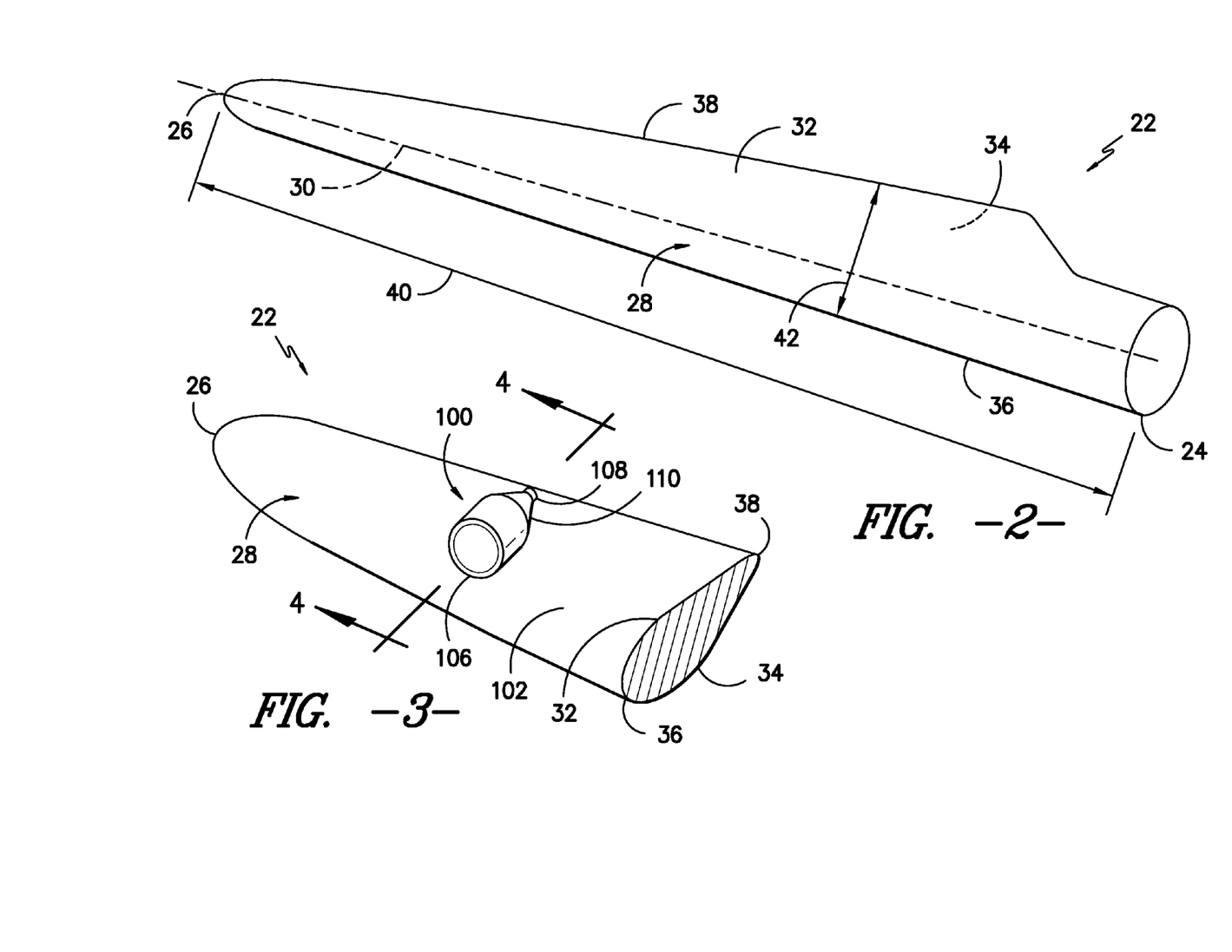
FIG. 2 illustrates a perspective view of one embodiment of one of the rotor blades of the wind turbine shown in FIG. 1.
FIG. 3 illustrates a partial, perspective view of the rotor blade shown in FIG. 2, particularly illustrating one embodiment of an ultrasonic sound emitting device mounted to an exterior surface of the rotor blade.

Referring now to FIG. 2, a perspective view of one of the rotor blades 22 shown in FIG. 1 is illustrated. As shown, the rotor blade 22 generally includes a blade root 24 and a blade tip 26 disposed opposite the blade root 24. A body 28 of the rotor blade 22 extends lengthwise along a longitudinal axis 30 between the blade root 24 and the blade tip 26 and generally serves as the outer shell of the rotor blade 22. As is generally understood, the blade body 28 may define an aerodynamic profile to enable the rotor blade 22 to capture kinetic energy from the wind using known aerodynamic principles. Thus, the body 28 may generally include a pressure side 32 and a suction side 34 extending between a leading edge 36 and a trailing edge 38. Additionally, the rotor blade 22 may have a span 40 defining the total length of the body 28 between the blade root 24 and the blade tip 26 and a chord 42 defining the total length of the body 28 between the leading edge 36 and the trailing edge 38. As is generally understood, the chord 42 may vary in length with respect to the span 40 as the rotor blade 22 extends from the blade root 24 to the blade tip 26.

As indicated above, the body 28 of the rotor blade 22 may generally define an aerodynamic profile or shape. For example, in several embodiments, the body 28 may define an airfoil shaped cross-section, such as by defining a symmetrical or cambered airfoil-shaped cross-section. In addition, the rotor blade 22 may also be aeroelastically tailored. Aeroelastic tailoring of the rotor blade 22 may entail bending of the blade 22 in a generally chordwise direction and/or in a generally spanwise direction. The chordwise direction generally corresponds to a direction parallel to the chord 42 of the rotor blade 22. The spanwise direction generally corresponds to a direction parallel to the span 40 or longitudinal axis 30 of the rotor blade 22. Aeroelastic tailoring may further entail twisting of the rotor blade 22, such as twisting the blade 22 in a generally chordwise and/or spanwise direction.

Figure 4:
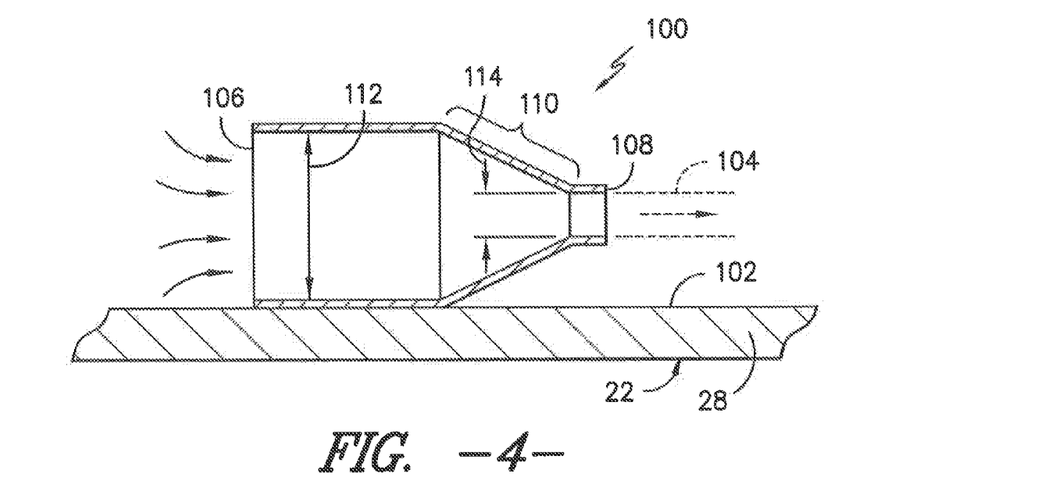
FIG. 4 illustrates a cross-sectional view of the ultrasonic sound emitting device shown in FIG. 3 taken about line 4-4.

Referring now to FIGS. 3 and 4, there is illustrated one embodiment of a passive, ultrasonic sound emitting device 100 that may be mounted onto the exterior of a rotor blade 22. In particular, FIG. 3 illustrates a partial, perspective view of a rotor blade 22 having the ultrasonic sound emitting device 100 mounted thereon. Additionally, FIG. 4 illustrates a cross-sectional view of the ultrasonic sound emitting device 100 shown in FIG. 3 taken about line 4-4.

As shown, in several embodiments, the ultrasonic sound emitting device 100 may comprise a converging nozzle 100 configured to generate an air jet (e.g., a supersonic jet) as air flows through the nozzle 100. For example, as particularly shown in the illustrated embodiment, the nozzle 100 may be mounted to an exterior surface 102 of the body 28 of a rotor blade 22. Thus, as the rotor blade 22 rotates during operation of the wind turbine 10, air flowing over the surface of the rotor blade may be directed into and accelerated through the nozzle 100. By appropriately selecting the dimensions of the nozzle 100, the airflow through the nozzle 100 may be accelerated to the point of choking (i.e., at or above a speed of Mach 1), thereby producing a supersonic jet. As the air jet 104 exits the nozzle 100, a shock wave-expansion system (i.e., shock cells or a shock cell structure/pattern) is created such that, as the turbulence in the shear layers around the jet 104 interact with the shock cells, an ultrasonic sound emission may be generated within a frequency ranging from about 25 kHz to about 100 kHz.

As particularly shown in FIG. 4, the nozzle 100 may generally include an inlet 106, an outlet 108 and a converging section 110 extending between the inlet 106 and the outlet 108. In general, it should be appreciated that the size and shape of the inlet 106 may be selected so that a sufficient amount of air is captured by the nozzle 100 in order to generate an air jet 104 at the nozzle outlet 108 capable of producing an ultrasonic sound emission. For example, in several embodiments, the inlet 106 may have a circular shape (e.g., by defining a bellmouth inlet) with a diameter 112. In other embodiments, the inlet 106 may have a non-circular shape, such as a rectangular shape (e.g., by defining a scoop inlet). Regardless, in several embodiments, a ratio of the cross-sectional area of inlet 106 to the cross-sectional area of the outlet 108 may range from about 3:1 to about 100:1, such as from about 3:1 to about 15:1 or from about 30:1 to about 100:1 or from about 15:1 to about 30:1 and all other subranges therebetween. However, it is foreseeable by the inventors of the present subject matter that the ratio of the cross-sectional area of inlet 106 to the cross-sectional area of the outlet 108 may be smaller and/or larger than the values contained within the ranges described above.

The converging section 110 may generally correspond to a portion of the nozzle 100 along which the cross-sectional area of the nozzle 100 steadily decreases between the inlet 106 and the outlet 108, thereby causing the air entering the inlet 106 to be accelerated as its flows through the converging section 110. Thus, by appropriately selecting the size of the outlet 108, the airflow through the converging section 110 may be choked as it reaches the outlet 108. As is generally understood, the cross-sectional area required to choke the airflow may generally vary depending on the total mass flow through the nozzle 100 (which may relate to the size of the inlet 106) and the total pressure of the flow (which may relate to the operating conditions of the wind turbine 10 as the rotor blades 22 rotate). However, in several embodiments, the outlet 108 may have a diameter 114 ranging from about 1 millimeter (mm) to about 15 mm, such as from about 1 mm to about 5 mm or from about 5 mm to about 15 mm and all other subranges therebetween. However, it is foreseeable by the inventors of the present subject matter that the diameter 114 of the outlet 108 may be smaller and/or larger than then values contained within the ranges described above.

It should be appreciated that, in several embodiments, the diameter 114 of the outlet 108 may be selected so as to specifically tailor the frequency of the ultrasonic sound emission produced by the nozzle 100. For instance, in one embodiment, an outlet diameter 114 ranging from about 5 mm to about 15 mm may be utilized to produce ultrasonic sound at a frequency of about 25 kHz while an outlet diameter 114 ranging from about 1 mm to about 5 mm may be utilized to produce ultrasonic sound at a frequency of about 100 kHz. Accordingly, it may be desirable to position multiple nozzles 100 having different outlet diameters 114 on each rotor blade 22 such that ultrasonic sound emissions at different frequencies may be produced.

It should be appreciated that the nozzle 100 may generally be configured to be mounted at any suitable location along the exterior surface 102 of the blade body 28 (e.g., at any suitable location along the pressure side 32 or suction side 34 of the rotor blade 22). For example, as shown in FIG. 3, in one embodiment, the nozzle 100 may be mounted to the exterior surface 102 of the blade body 28 at or adjacent to the blade tip 26. In alternative embodiments, the nozzle 100 may be mounted at any other suitable location along the span 40 of the rotor blade 22, such as by mounting the nozzle 100 around the middle of the span 40 or at location proximal to the blade root 24. Similarly, the nozzle 100 may be mounted at any suitable location along the chord 42 of the rotor blade 22. For example, as shown in FIG. 3, the nozzle 100 may be mounted to the rotor blade 22 such that the inlet 106 is located at or adjacent to the leading edge 36. However, in other embodiments, the nozzle 100 may be mounted at a location closer to the trailing edge 38.

It should also be appreciated that, in several embodiments, a plurality of nozzles 100 may be mounted to the exterior surface 102 of the blade body 28. For example, in one embodiment, a plurality of nozzles 100 may be grouped together at a particular location on the rotor blade 22. Alternatively, the nozzles 100 may be spaced apart along the exterior surface 102 of the rotor blade 22, such as by being spaced apart along the span 40 and/or chord 42 on the pressure and/or suction side 32, 34 of the blade 22.

Additionally, it should be appreciated that, in several embodiments, the location and number of nozzles 100 on each rotor blade 22 may be selected such that a specific noise level output is achieved a predetermined distance from the wind turbine (e.g., at a distance that is sufficient to allow bats to avoid being struck by the rotor blades). For instance, in one embodiment, the location and number of nozzles 100 on each rotor blade 22 may be selected such that the noise level at a predetermined distance from the wind turbine is greater than 65 decibels (dBs), such as greater than 70 dBs or greater than 75 dBs.

Moreover, it should be appreciated that each nozzle 100 may generally be mounted to the exterior surface 102 of the blade body 28 using any suitable fastening means and/or method known in the art. For example, in one embodiment, each nozzle 100 may be mounted to the blade body 28 using one or more suitable fastening mechanisms (e.g., screws, bolts, pins, rivets, brackets and/or the like). Alternatively, each nozzle 100 may be mounted to the blade body 28 using a suitable tape or adhesive material.

Figure 5:
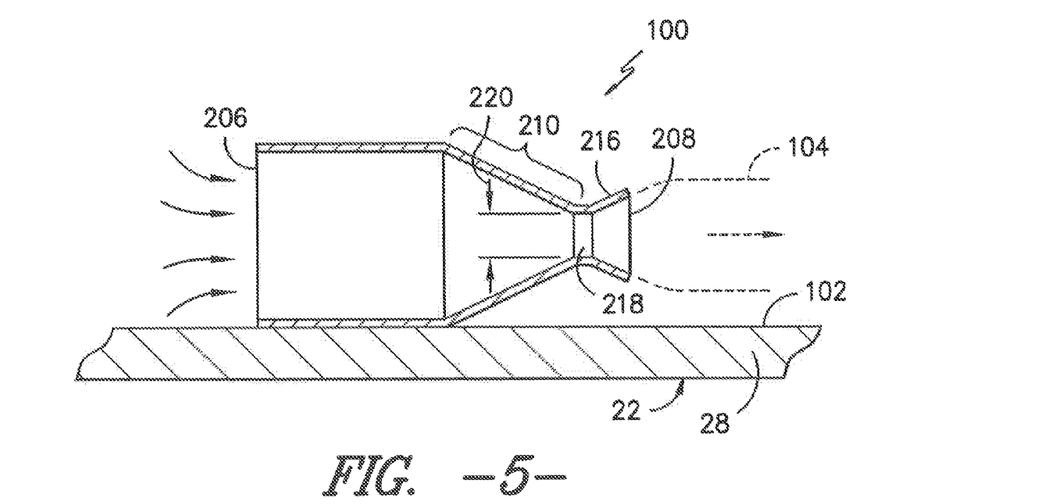
FIG. 5 illustrates a cross-sectional view of another embodiment of an ultrasonic sound emitting device mounted to an exterior surface of the rotor blade.

Referring now to FIG. 5, a cross-sectional view of another embodiment of the nozzle 100 shown in FIGS. 3 and 4 is illustrated in accordance with aspects of the present subject matter. As shown, the nozzle 100 may be configured as a de Laval or any other suitable convergent-divergent nozzle. Thus, in addition to having an inlet 206, an outlet 208 and a converging section 210, the nozzle 100 may also include a diverging section 216 extending between the converging section 210 and the outlet 208. In such an embodiment, a nozzle throat 218 may be located between the converging section 210 and the diverging section 216 and may define the point at which the cross-sectional area of the nozzle 100 transitions from decreasing (along the converging section 210) to increasing (along the diverging section 216).

By configuring the nozzle 100 in the manner shown in FIG. 5, the airflow may, for example, be accelerated to a supersonic speed as it flows through the converging section 210 and into the nozzle throat 218. Thus, similar to the outlet 108 described above, the size of the nozzle throat 218 may generally be selected based on the total mass flow through the nozzle 100 (which may relate to the size of the inlet 206) and the total pressure of the flow (which may relate to the operating conditions of the wind turbine 10 as the rotor blades 22 rotate). For example, in embodiments in which the inlet 206 is sized similar the inlet 206 described above, the nozzle throat 218 may have a diameter 220 ranging from about 1 millimeter (mm) to about 15 mm, such as from about 1 mm to about 5 mm or from about 5 mm to about 15 mm and all other subranges therebetween. However, it is foreseeable by the inventors of the present subject matter that the diameter 220 and/or cross-sectional area of the nozzle throat 218 may be smaller and/or larger than then values contained within the ranges described above.

In addition, by configuring the nozzle 100 to include the diverging section 216, the air jet 104 traveling through the nozzle throat 218 may expand as it flows through the diverging section 216. Such expansion may generally allow the shape of air jet 104 to be modified as it exits through the outlet 208, thereby altering the frequency of the ultrasonic sound emitted by the jet 208. It should be appreciated that the diameter/cross-sectional area to which the nozzle 100 increases between the throat 218 and the outlet 208 may generally vary depending on the sound characteristics desired to be achieved, the dimensions of the inlet 206 and nozzle throat 218 and/or various other parameters/conditions. However, in several embodiments, a ratio of the cross-sectional area of the outlet 108 to the cross-sectional area of the throat 218 may range from about 1:1 to about 1.2:1, such as from about 1.03:1 to about 1.1:1 or from about 1.1:1 to about 1.2:1 and all other subranges therebetween. However, it is foreseeable by inventors of the present subject matter that the ratio of the cross-sectional area of the outlet 108 to the cross-sectional area of the throat 218 may be smaller and/or larger than then values contained within the ranges described above.

Figure 6:
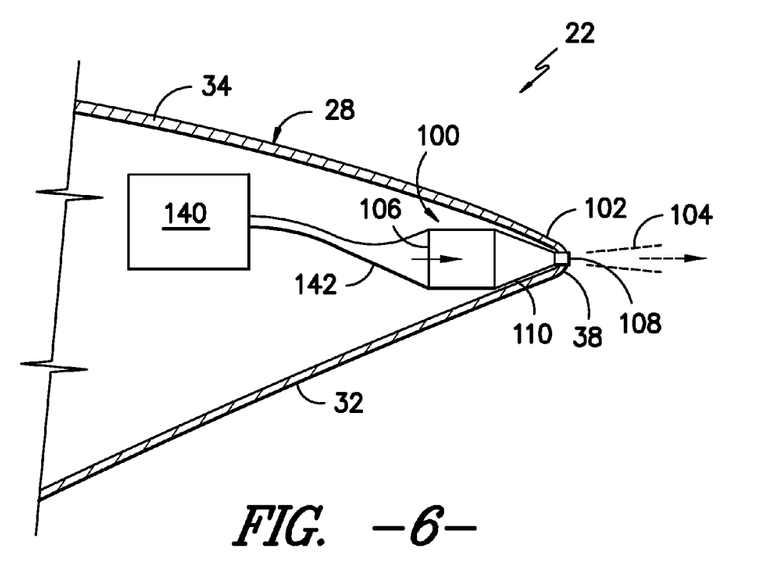
FIG. 6 illustrates a partial, cross-sectional view of the rotor blade shown in FIG. 1, particularly illustrating an embodiment of an ultrasonic sound emitting device that may be at least partially mounted within the rotor blade.

It should be appreciated that, in addition to being mounted on an exterior surface 102 of the body 28 of a rotor blade 22, the nozzles 100 described above may also be mounted within the blade body 28. For example, FIG. 6 illustrates the nozzle 100 shown in FIGS. 3 and 4 mounted partially within the body 28. Specifically, as shown, the nozzle 100 is mounted within the rotor blade 22 such that the outlet 108 extends through the blade body 28 to an exterior surface 102 of the blade 22. As such, the air jet 104 generated within the nozzle 100 may be expelled to the exterior of the rotor blade 22, thereby ensuring that the ultrasonic sound emission generated as the jet 104 exits the nozzle 100 propagates outwardly from the rotor blade 22.

To supply air to the nozzle 100 in such embodiment, the inlet 106 may be in flow communication with a pressurized air source (e.g., an air compressor, pressurized vessel and/or the like). For example, as shown in FIG. 6, the pressurized air source 140 may be disposed within the rotor blade 22 and may be in flow communication with the nozzle 100 inlet via a hose 142 or other suitable coupling. Alternatively, the pressurized air source 140 may be disposed at any other suitable location (e.g., within the hub 20, nacelle 116 or tower 12 of a wind turbine 10) and may be coupled to the nozzle inlet 106 via any suitable fluid coupling.

It should be appreciated that the pressurized air source 140 may generally be configured to supply air to the nozzle 100 at any given pressure. As such, the diameters 112, 114 (FIG. 4) or cross-sectional areas of the inlet 106 and outlet 108 (and, in some instances, the diameter/cross-sectional area of the nozzle throat 218 (FIG. 5)) may generally be selected such that, at the given air pressure, an air jet 104 is expelled from the nozzle outlet 108 that is capable of producing an ultrasonic sound emission.

It should also be appreciated that the nozzle 100 may be mounted within the rotor blade 22 such that the outlet 108 extends through the blade body 28 at any suitable location along the blade 22. For example, as shown in FIG. 6, the nozzle 100 is positioned within the rotor blade 22 such that the outlet 108 extends through the blade body 28 at the trailing edge 38. However, in other embodiments, the outlet 108 may be configured to extend through the blade body 28 at the leading edge 36 or at any position on the pressure side 34 or the suction side 36 of the rotor blade 22. Additionally, in several embodiments, a plurality of nozzles 100 mounted within the rotor blade 22. For example, in one embodiment, a plurality of nozzles 100 may be mounted within the rotor blade 22 such that the outlet 108 of each nozzle 100 extends through the blade body 28 at the trailing edge 38 at various locations along the span 40 of the blade 22.

Figure 7:
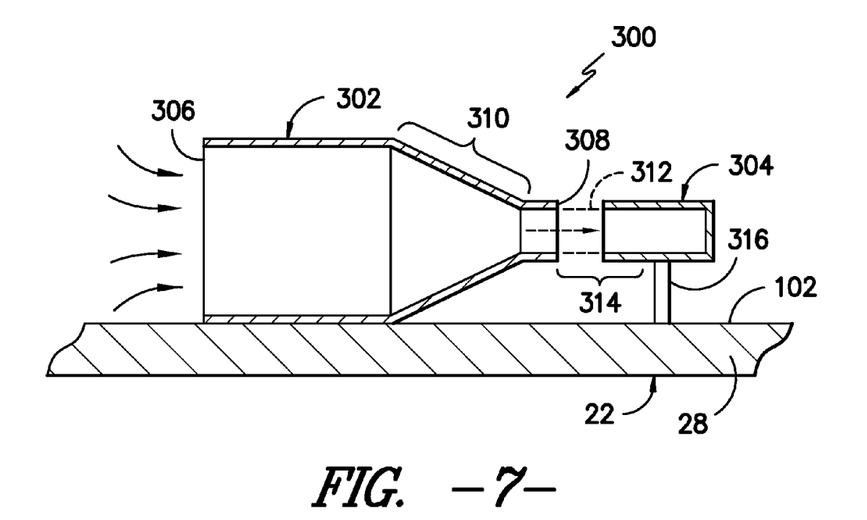
FIG. 7 illustrates a cross-sectional view of a further embodiment of an ultrasonic sound emitting device mounted to an exterior surface of the rotor blade; and, FIG. 8 illustrates a partial, cross-sectional view of the rotor blade shown in FIG. 1, particularly illustrating another embodiment of an ultrasonic sound emitting device that may be at least partially mounted within the rotor blade.

Referring now to FIG. 7, a cross-sectional view of another embodiment of an ultrasonic sound emitting device 300 that may be mounted to an exterior surface 102 of the body 28 of a rotor blade 22 is illustrated in accordance with aspects of the present subject matter. As shown, the ultrasonic sound emitting device 300 may be configured as a Hartmann generator or any other suitable powered resonance tube. Thus, the device 300 may include both a converging nozzle 302 and a closed-end tube 304 disposed downstream of the nozzle 302.

In general, the nozzle 302 may be configured the same as or similar to the nozzle 100 described above with reference to FIGS. 3 and 4. For example, as shown in FIG. 7, the nozzle 302 may include an inlet 306, an outlet 308 and a converging section 310 extending between the inlet 306 and the outlet 308. As described above, the nozzle 302 may generally be configured to generate an air jet 312 (e.g., a supersonic jet) as air flows through the nozzle 302. Thus, the dimensions of the inlet 306 and the outlet 308 may generally be selected so that a sufficient amount of air is captured and accelerated through the nozzle 302 in order to produce such a jet 312. For instance, in one embodiment, the diameters or cross-sectional areas of the inlet 306 and outlet 308 may be the same as or similar to the diameters or cross-sectional areas of the inlet 106 and outlet 108 described above.

Similar to various Hartmann generators and/or other powered resonance tubes known in the art, the closed-end tube 304 may generally be configured to have the same diameter and/or cross-sectional area as the nozzle outlet 308 and may be aligned with the outlet 308 such that the air jet 312 exiting the nozzle 302 is directed into the tube 304. Thus, by positioning the tube 304 relative to the outlet 308 so that the tube 304 is disposed within a compression region 314 of the shock cell structure/pattern created at the outlet 308 as the jet 312 exits the nozzle 302, a strong flow instability (including successive compression and expansion waves) may be created within the tube 304. As a result of such flow instability, an ultrasonic sound emission may be generated by the ultrasonic sound emitting device 300 at a frequency ranging from about 25 kHz to about 100 kHz.

It should be appreciated that the closed-end tube 304 may generally be mounted in alignment with the nozzle outlet 308 using any suitable means and/or method known in the art. For example, as shown in FIG. 7, the tube 304 may be mounted to the rotor blade 22 using any suitable coupling 316 (e.g., a pin, bolt, rod and/or other suitable linkage) that permits the tube 304 to be positioned in alignment with the nozzle outlet 308. Alternatively, the tube 304 may be held in alignment with the nozzle outlet 308 via a coupling or linkage extending between the tube 304 and the nozzle 302.

Figure 8:
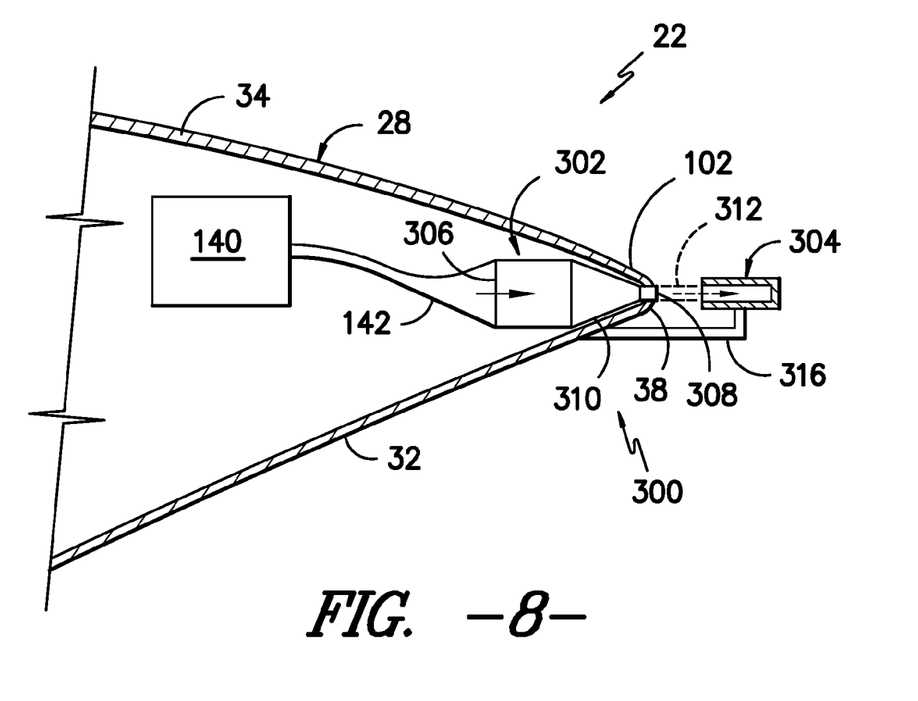

Referring now to FIG. 8, the ultrasonic sound emitting device 300 shown in FIG. 7 is illustrated in a configuration in which the nozzle 302 is partially mounted within the rotor blade 22. Specifically, as shown, the nozzle 302 is mounted within the rotor blade 22 such that the outlet 308 extends through the blade body 38. As such, the air jet 312 generated within the nozzle 302 may be expelled to the exterior of the rotor blade 22. Additionally, as shown, the closed-end tube 304 may be mounted outside the rotor blade 22 (e.g., using a suitable coupling 316) such that the tube 304 is generally aligned with the nozzle outlet 308. As such, the air jet 312 generated by the nozzle 302 may be directed into the closed-end tube 304, thereby producing an ultrasonic sound emission propagating outwardly from the rotor blade 22.

As shown in FIG. 8, similar to the embodiment described above with reference to FIG. 6, the nozzle inlet 306 may be in flow communication with a suitable pressurized air source 140 (e.g., an air compressor, pressurized vessel and/or the like) via a hose 142 or other suitable coupling. In such an embodiment, the pressurized air source 140 may generally be configured to supply air to the nozzle 302 at any given pressure. Thus, the diameters or cross-sectional areas of the inlet 306 and outlet 308 may generally be selected such that, at the given air pressure, an air jet 312 is expelled from the nozzle outlet 308 and into the closed-end tube 304 that allow an ultrasonic sound emission to be produced.

Additionally, it should be appreciated that the nozzle 302 may be mounted within the rotor blade 22 such that the outlet 308 extends through the blade body 28 at any suitable location along the blade 22. For example, as shown in FIG. 8, the nozzle 302 is positioned within the rotor blade 22 such that the outlet 308 extends through the blade body 28 at the trailing edge 38. In other embodiments, the outlet 308 may be configured to extend through the blade body 28 at the leading edge 36 or at any position on the pressure side 34 or the suction side 36 of the rotor blade 22. However, regardless of the positioning of the nozzle 302, the closed-end tube 304 may be configured to be mounted relative to the nozzle 302 such that the tube 304 is aligned with the nozzle outlet 308.

It should be appreciated that the present subject matter is also directed to a method for producing an ultrasonic sound emission from a rotor blade 22 of a wind turbine 10. In several embodiments, the method may include rotating the rotor blade 100 such that an air flow is directed through a nozzle 100, 302 mounted to an exterior surface 102 of the rotor blade 22, the nozzle 100, 302 including an inlet 106, 206, 306, an outlet 108, 208, 308 and a converging section 110, 210, 310 between the inlet 106, 206, 306 and outlet 108, 208, 308 and accelerating the air flow through the converging section 110, 210, 310 such that an ultrasonic sound emission is produced.

It should also be appreciated that, although the present subject matter has been described herein as using converging nozzles to produce ultrasonic sound emissions, various other ultrasonic sound emitting devices may also be used to deter bats from a wind turbine. For example, in one embodiment, a speaker capable of producing ultrasonic sound emissions may be mounted on or within a rotor blade 22. Alternatively, various other devices, such as a powered Helmholtz resonator, a dual bi-morph synthetic jet and/or the like, may be mounted on or within a rotor blade 22 in order to produce ultrasonic sound emissions.

Additionally, although the present subject matter has been described primarily as using converging nozzles to produce a supersonic air jet, ultrasonic sound emissions may also be produced with sub-sonic air jets. Thus, it should be appreciated that the disclosed subject matter may generally be utilized to generate any suitable air jet that is capable of producing an ultrasonic sound emission.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, the rotor blade comprising:
   a body extending between a blade root and a blade tip, the body include a pressure side and a suction side extending between a leading edge and a trailing edge; and,
   a nozzle mounted on or within the body that is configured to receive an air flow therethrough, the nozzle including an inlet, an outlet and a converging section between the inlet and the outlet, the nozzle defining an uninterrupted flow path between the inlet and the outlet such that all of the air flow received within the inlet is expelled from the nozzle at the outlet, the converging section being configured to accelerate the air flow through the nozzle such that an air jet is expelled from the outlet that produces an ultrasonic sound emission outside the nozzle.

2. The rotor blade of claim 1, wherein the nozzle is mounted to an exterior surface of the body.

3. The rotor blade of claim 2, wherein the nozzle is mounted to the body at or adjacent to the blade tip.

4. The rotor blade of claim 3, wherein the nozzle is mounted to the body such that the inlet is disposed at or adjacent to the leading edge.

5. The rotor blade of claim 1, wherein a ratio of a cross-sectional area of the inlet to a cross-sectional area of the outlet ranges from about 3:1 to about 100:1.

6. The rotor blade of claim 1, wherein the outlet has a diameter ranging from about 1 mm to about 15 mm.

7. The rotor blade of claim 1, wherein the nozzle further comprises a diverging section downstream of the converging section, a nozzle throat being defined between the converging and diverging sections.

8. The rotor blade of claim 1, wherein the nozzle is mounted within the body such that the outlet extends through the body, the inlet being in flow communication with a pressurized fluid source such that the air flow corresponds to a pressurized air flow from the pressurized fluid source.

9. The rotor blade of claim 8, wherein the outlet extends through the body at the trailing edge.

10. The rotor blade of claim 1, further comprising a closed-end tube disposed downstream of the nozzle such that the air flow exiting the outlet is directed into the closed-end tube.

11. The rotor blade of claim 10, wherein the closed-end tube is coupled to an exterior surface of the body.

12. The rotor blade of claim 10, wherein the closed-end tube is disposed downstream of the trailing edge.

13. A wind turbine, comprising:
   a tower;
   a nacelle mounted atop the tower;
   a rotor coupled to the nacelle, the rotor comprising a hub and at least one rotor blade extending outwardly from the hub; and,
   a nozzle mounted on or within the at least one rotor blade that is configured to receive an air flow therethrough, the nozzle including an inlet, an outlet and a converging section between the inlet and the outlet, the nozzle defining an uninterrupted flow path between the inlet and the outlet such that all of the air flow received within the inlet is expelled from the nozzle at the outlet, the converging section being configured to accelerate the air flow through the nozzle such that an air jet is expelled from the outlet that produces an ultrasonic sound emission outside the nozzle.

14. The wind turbine of claim 13, wherein the nozzle is mounted to an exterior surface of the at least one rotor blade.

15. The wind turbine of claim 13, wherein a ratio of a cross-sectional area of the inlet to a cross-sectional area of the outlet ranges from about 3:1 to about 100:1.

16. The wind turbine of claim 13, wherein the outlet has a diameter ranging from about 1 mm to about 15 mm.

17. The wind turbine of claim 13, wherein the nozzle further comprises a diverging section downstream of the converging section, a nozzle throat being defined between the converging and diverging sections.

18. The wind turbine of claim 13, wherein the nozzle is mounted within the rotor blade such that the outlet extends through a body of the rotor blade, the inlet being in flow communication with a pressurized fluid source such that the air flow corresponds to a pressurized air flow from the pressurized fluid source.

19. The wind turbine of claim 13, further comprising a closed-end tube disposed downstream of the nozzle such that the air flow exiting the outlet is directed into the closed-end tube.

20. A method for producing an ultrasonic sound emission from a rotor blade of a wind turbine, the method comprising:
   rotating the rotor blade such that an air flow is directed through a nozzle mounted to an exterior surface of the rotor blade, the nozzle including an inlet, an outlet and a converging section between the inlet and outlet, the nozzle defining an uninterrupted flow path between the inlet and the outlet such that all of the air flow received within the inlet is expelled from the nozzle at the outlet; and
   accelerating the airflow through the converging section such that an air jet is expelled from the outlet that produces an ultrasonic sound emission outside the nozzle.

* * * * *